(12) United States Patent
Ralphs

(10) Patent No.: US 9,189,160 B2
(45) Date of Patent: Nov. 17, 2015

(54) TRANSPORT AGNOSTIC SEQUENTIAL DRIVE RECOVERY WITH MODE DATA SNOOPING

(71) Applicant: Oracle International Corporation, Redwood City, CA (US)

(72) Inventor: Randall Kent Ralphs, Nederland, CO (US)

(73) Assignee: Oracle International Corporation, Redwood City, CA (US)

( * ) Notice: Subject to any disclaimer, the term of this patent is extended or adjusted under 35 U.S.C. 154(b) by 219 days.

(21) Appl. No.: 13/909,849

(22) Filed: Jun. 4, 2013

(65) Prior Publication Data

US 2014/0355148 A1    Dec. 4, 2014

(51) Int. Cl.
*G06F 12/00* (2006.01)
*G06F 3/06* (2006.01)

(52) U.S. Cl.
CPC ............ *G06F 3/0605* (2013.01); *G06F 3/0653* (2013.01); *G06F 3/0682* (2013.01)

(58) Field of Classification Search
CPC .... G06F 3/0605; G06F 3/0653; G06F 3/0682
See application file for complete search history.

(56) References Cited

U.S. PATENT DOCUMENTS 6,519,105 B1 *   2/2003   Takayama .................. 360/55

* cited by examiner

*Primary Examiner* — Cheng-Yuan Tseng
*Assistant Examiner* — Alan Otto
(74) *Attorney, Agent, or Firm* — Polsinelli PC

(57) ABSTRACT

Implementations of the present disclosure involve a system and/or method for a target level driver of a host computer to obtain and maintain the state or mode of a physical or virtual tape drive storage system to restore the state of the tape drive storage system. The target level driver monitors one or more commands transmitted to the tape drive system from a user or administrator of the tape drive system. Through analysis and parsing of the one or more commands, the target level driver determines an operational mode state of the tape drive system and stores said mode state. Because the target level driver monitors the commands provided to the tape drive system, the stored operational mode state may include one or more operational modes not reported by the tape drive system.

18 Claims, 6 Drawing Sheets

TRANSPORT AGNOSTIC SEQUENTIAL DRIVE RECOVERY WITH MODE DATA SNOOPING

FIELD OF THE DISCLOSURE

Aspects of the present disclosure relate to computer data storage systems. More particularly, aspects of the present disclosure involve systems and methods for monitoring and maintaining a mode of a storage appliance for drive recovery.

BACKGROUND

Computers are ubiquitous in today's society. They come in all different varieties and can be found in places such as automobiles, laptops or home personal computers, banks, personal digital assistants, cell phones, as well as many businesses. As computers become more commonplace, there is an ever increasing need for the storage of very large amounts of data. One example of a high-capacity data storage system involves a physical tape drive system.

Physical tape drive systems typically include a storage mechanism (such as a magnetic tape or disk backing stores) to which data may be written and stored on one or more physical media and a control device, known as a host or initiator, that provides an interface for use of the tape drive or target using a transmission protocol, such as small computer system interface (SCSI). Through the host (or a remote hosting computer connected or in communication with the host), data is provided to the tape drive for storage in one or more physical storage media. The host also provides control to a user of the system to select various modes of storage and/or operation of the tape drive. In general, the control and operation of the tape drive is conducted through the host device.

In some embodiments of a tape drive storage system, several hosts may be connected to or otherwise in communication with a tape drive such that the tape drive can store data from the multiple hosts. Further, each host may configure the various storage and operation modes of the tape drive system as desired by the user of the tape drive system. However, because several hosts can alter the mode of a tape drive system at any time, data written to the tape drive may not be written under the mode desired by a particular host. It is with these and other issues in mind that various aspects of the present disclosure were developed.

SUMMARY

One implementation of the present disclosure may take the form of a method for operating a tape drive system. The method includes the operations of receiving a change mode request from an application executing on a host computer, the change mode request provided by the application configured to change an operational mode of a tape drive, parsing the change mode request to determine at least one operational mode change requested in the change mode request and storing at least one operational mode change requested in the change mode request in a database. The method further includes the operations of converting the change mode request to a change mode command that can be interpreted by the tape drive and transmitting the change mode request to the tape drive through an input/output port.

Another implementation of the present disclosure may take the form of a system for controlling a data storage device. The system includes a host computer. The host computer includes a user application configured to provide an interface to a user, a storage component for storing computer-readable data and a target level driver. The target level driver includes instructions that configure the driver to receive a change mode request from the user application, the change mode request provided by the application configured to change an operational mode of the tape drive, parse the change mode request to determine at least one operational mode change requested in the change mode request, store at least one operational mode change requested in the change mode request in the storage component and create and transmit one or more change mode commands to the tape drive, the one or more commands configured to be executed by the tape drive to change the operational mode of the tape drive.

DETAILED DESCRIPTION

Implementations of the present disclosure involve a system and/or method for obtaining and maintaining the state or mode of a physical or virtual tape drive storage system to restore the state of the tape drive storage system. In one embodiment, a host computer comprises a target level driver configured to obtain and maintain the operating mode of the tape drive system. The target level driver monitors one or more commands transmitted to the tape drive system from a user or administrator of the tape drive system. Through analysis and parsing of the one or more commands, the target level driver determines an operational mode state of the tape drive system and stores said mode state. Because the target level driver monitors the commands provided to the tape drive system, the stored operational mode state may include one or more operational modes not reported by the tape drive system. In addition, the target level driver may return the tape drive system to a desired operational mode upon receipt of a notice of mode change from the tape drive system. In this manner, the target level driver maintains the integrity of data written to or read from the tape drive system in accordance with one or more preferences provided through the host computer.

Figure 1:
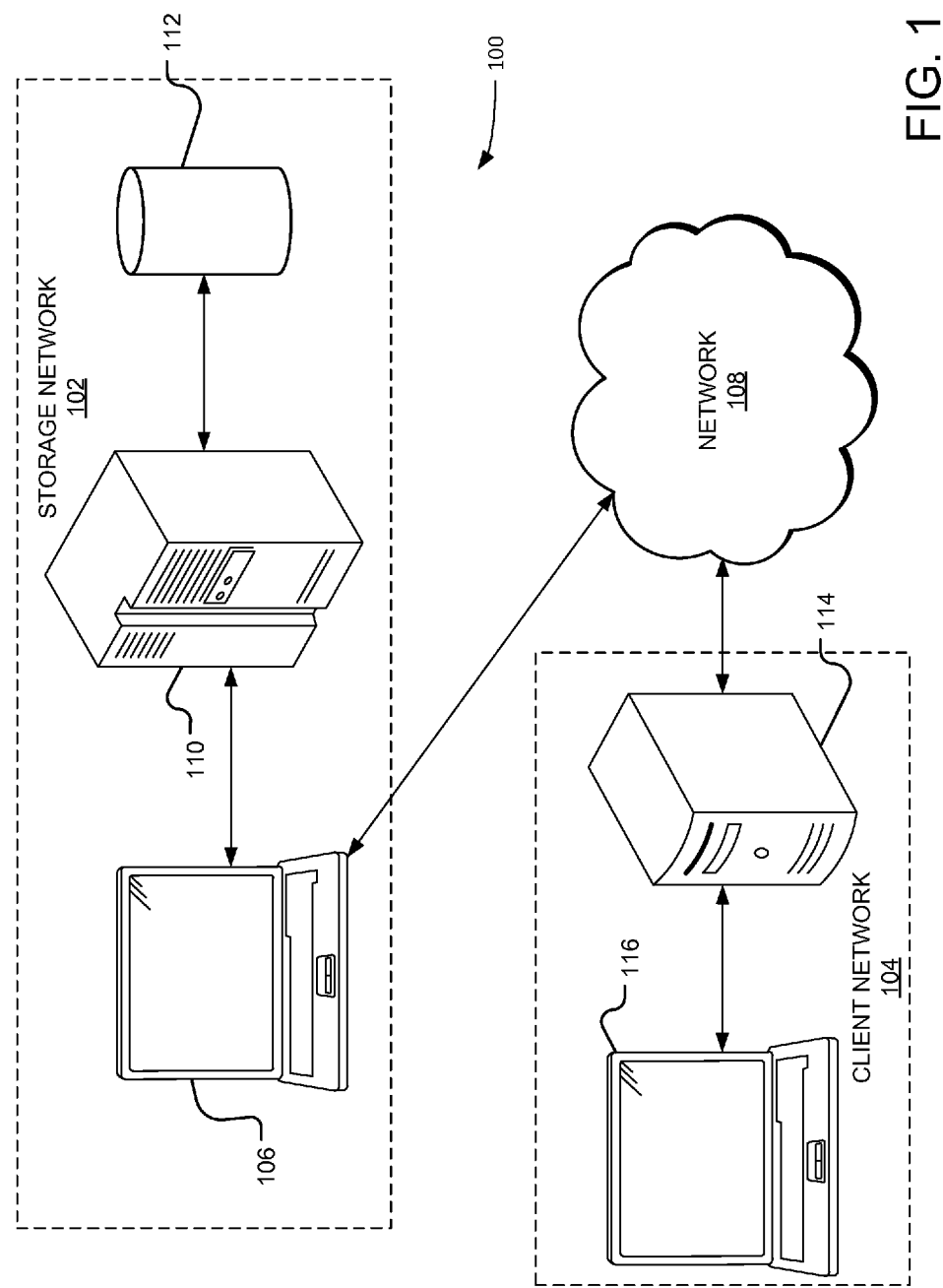
FIG. 1 is an example storage system that may be used in implementing various systems and methods discussed herein.

FIG. 1 is an example storage system that may be used in implementing various systems and methods discussed herein. The example storage system 100 includes a storage network 102, a client network 104, and an administrator system 106. In one embodiment, the storage network 102 is accessible by the client network 104 using the network 108. In particular, the client network 104 may access the storage network 102 by remotely logging into the administrator system 106 to control and/or provide data for storage to the storage network. It will be appreciated, however, that the various networks may comprise an integrated network, and the connections between the networks represent but one possible network topology. The depicted networks 102, 104, and 108 may also be local in nature or geographically dispersed, such as with large private enterprise networks or the Internet. The administrator system 106 provides various functions for the storage system 100, including setting the operational mode of the storage system 102. The administrator system 106 may be included in the storage network 102, the client network 104, and/or in another network connected via the network 108. Moreover, the administrator system 106 may be connected directly to the various networks or the devices within the network. As such, it is possible that many unique terminals or computing elements may be present within the storage system 100, and through which administrator functions may be performed. In general, the administrator system 106 comprises one or more host computers in communication with a storage device, such as a physical or virtual tape drive 112.

In one implementation, the client network 104 includes one or more servers 114 connecting one or more client devices 116 to the network 108. The server 114 may be a single server, a plurality of servers with each such server being a physical server or a virtual machine, or a collection of both physical servers and virtual machines (VM). A virtual machine is a software implementation of a machine or component (e.g., a computing device) that executes programs like a physical machine. For example, a virtual machine may emulate an operating system (OS).

The client device 116 is generally any form of computing device capable of interacting with the network 108, such as a terminal, a personal computer, a portable computer, a mobile device, a tablet (e.g., iPad), a multimedia console, etc. In some implementations, the storage network 102 includes one or more host computers 106 with one or more user interfaces, including, for example, a Browser User Interface (BUI), permitting a client to interact with the storage network 102 to access and/or write data to the storage network.

In one implementation, the storage network 102 includes one or more storage appliances 110, each including storage media 112. Generally, the storage appliance 110 manages the storage of data on the storage media 112. In one particular implementation, the storage media 112 includes a magnetic tape drive on which data may be written and stored. In another implementation, the storage media 112 may involve spinning media (e.g., disc drives) as well as various forms of solid state memory. In either implementation, the host computer 106 may control the flow of data to and from the storage media 112, including controlling the various operational modes of the storage appliance 110.

Figure 2:
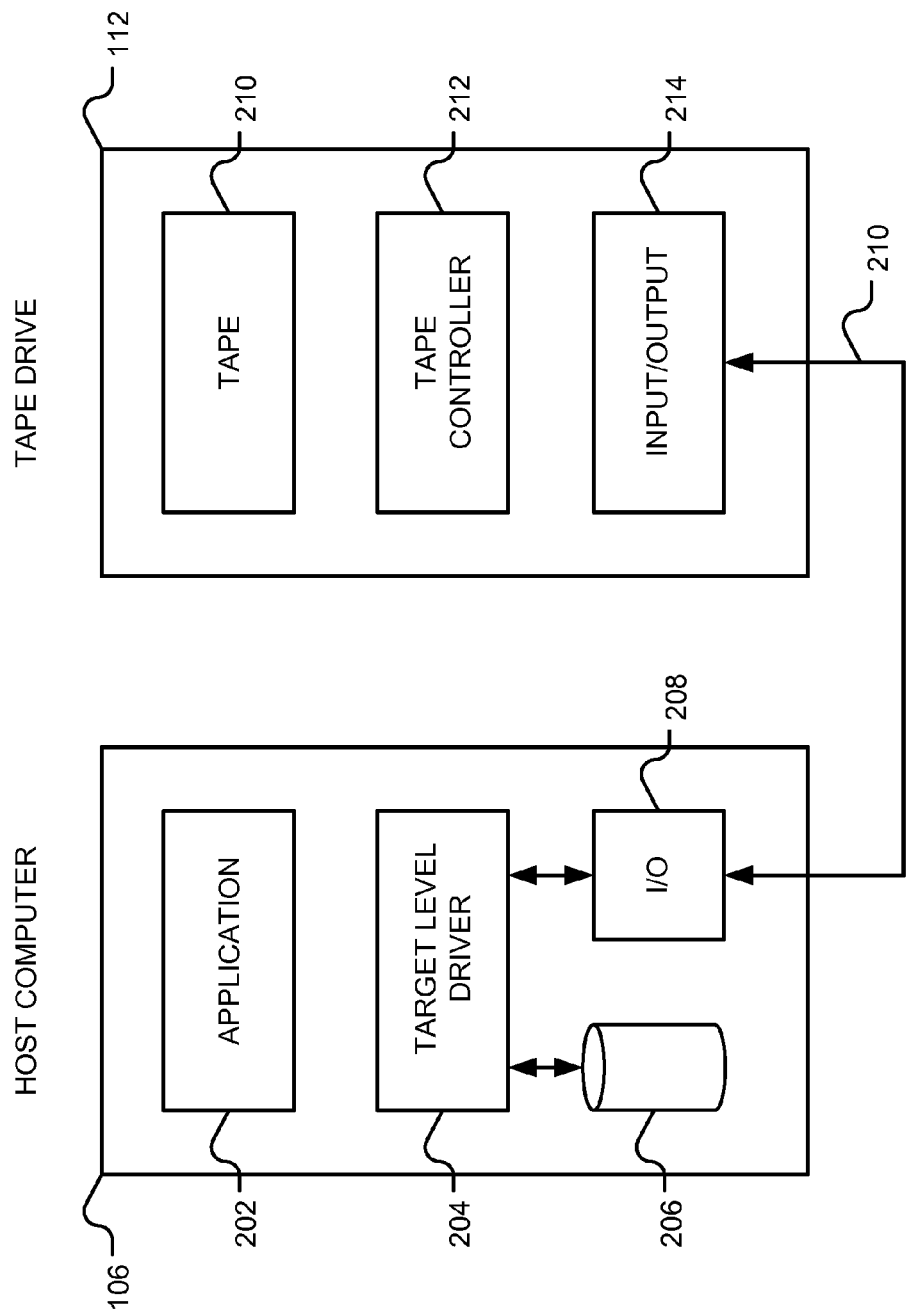
FIG. 2 is an illustration of a host computer and a tape drive of a tape storage system.

FIG. 2 is a detailed illustration of a host computer and a tape drive of a tape storage system, such as the storage tape storage system of FIG. 1. As such, host computer 106 and tape drive 112 of FIG. 2 is the same or similar to the host computer and tape drive of FIG. 1. As mentioned above, the host computer 106 may provide instructions to control the various operational modes supported by the tape drive 112, in addition to the one or more data blocks to be written to or read from the tape drive. The general operation of the host computer 106 in relation to the tape drive 112 is provided below. Although only a few components of the host computer 106 and the tape drive 112 are illustrated in FIG. 2 and discussed below, it should be appreciated that the host computer and tape drive may include any additional components not described herein. For example, the host computer may include one or more host bus adapters and/or signal multiplexers. Further, the tape drive 112 may include any number of physical tapes and/or control mechanism to physically maneuver the tapes into and out of one or more readers. Thus, any number of additional components are contemplated in aiding the operation of the host computer 106 and the tape drive 112 of FIG. 2.

The host computer 106 of FIG. 2 includes an application 202, a target level driver 204, a database 206 and an input/output interface 208. In general, the application 202 provides an interface to a user of the host computer for access to the tape drive 112. For example, the application 202 may include a user interface that is presented to a user on a display device associated with the host computer. Through the interface, the user can provide one or more commands to the tape drive system to configure one or more operational modes of the tape drive 112 and provide and/or retrieve data. In another example, the application 202 may be accessed remotely through a network. The application 202 may provide a user of the accessing device an interface through which the tape drive 112 may be controlled. In general, the application 202 presents an interface through which the user of the tape drive system provides instructions to the tape drive system during storage and retrieval of data.

Also associated with the host computer 106 is a target level driver 204. The target level driver 204 is a program operating on the host computer that communicates with the application to receive and interpret the commands provided through the application 202. In essence, the target level driver 204 is an interpreter between the commands provided by the application and the tape drive 112. Thus, in general, the application 202 is presented to a user of the host computer 106, while the target level driver 204 remains hidden from the user. Also in communication with the target level driver 204 is one or more computer readable media 206. The computer readable media 206 is configured to store information concerning the operation of the tape drive 112. In one example, one or more operational modes of the tape drive 112 is stored in the computer readable media 206. The details of the computer readable media 206 of the host computer 106 are discussed in more detail below.

The host computer 106 further includes one or more input/output (I/O) ports for communicating along a communication line 210 with the tape drive 112. In one embodiment, the host computer may include three or more communication ports and lines for communicating with the tape drive 112 to provide fail redundancies to the system. In general, the host computer 106 utilizes the I/O ports 208 and communication line 112 to transmit one or more operational commands to the tape drive 112, as well as data that is to be stored in the tape drive system. In addition, data retrieved from the tape drive 112 may also be transmitted along the communication line 210 through the I/O port. In one embodiment of tape drive system, the I/O may include any number of transmission ports, such that Small Computer System Interface (SCSI) port or the like. However, the methods and embodiments described herein may operate independent of the type of physical transport utilized by the host computer 106 and tape drive 112.

To facilitate the communication between the host computer 106 and the tape drive 112, the tape drive 112 may also include an I/O port or ports 214 in communication with the communication line 210. Through the I/O port 214, the tape drive 112 receives commands and/or data for storage on the tape 210. Further, in some embodiments, the tape drive 112 may include any number of I/O ports 214 such that more than one host computer 106 may have access to and control the operation of the tape drive. In such embodiments, a tape controller 212 may be configured to handle control requests from the host computers such that the received data is not corrupted when stored. In general, the tape controller 212 is an application that executes on the tape drive 112 and controls the operation of the tape drive in response to one or more received commands. For example, the host computer 106 may provide a command to the tape drive to store incoming data in a particular location on the tape 210. In response, the tape controller 212 may control the operation of the storage of the received data on the tape 210 at the requested position on the tape. The tape controller 212 may also be configured to place the tape drive 112 in one or more operational modes or states, as discussed in more detail below.

As mentioned above, one or more commands may be transmitted from the application 202 of the host computer 106 in response to an input received by a user of the host computer. Some such commands may alter the operational mode of the tape drive 112. For example, a user of the host computer 106 may utilize the application 202 to select data protection on a block of data to be stored on the tape drive 112. Data protection of stored data may be considered an operational mode of the tape drive. This command is received by the target level driver 204 which translates the mode change request into a command or series of commands that are transmitted to the tape drive 112 for execution by the tape controller 212. In this manner, the operational modes of the tape drive 112 may be selected by a user and executed by the tape controller 212. Other operational modes include, but are not limited to, compression of stored and read data, storing of data at a particular location on the tape, block size of stored data, and the like. In general, any operational parameter of the tape drive 110 that is selectable by a user of the host computer 106 is considered an operational mode or mode of the tape drive.

In one embodiment of the present disclosure, the host computer may maintain the mode state of the tape drive 112 as requested by the application 202. Such mode state information may be utilized by the host computer 106 to place the tape drive 112 in the proper mode state in case the tape drive fails or is altered by another host computer utilizing the tape drive. For example, the host computer 106 may request a first mode state of the tape drive 112 for storage of storage of data to be received. However, prior to the data being provided to the tape drive 112, the mode state of the tape drive may be altered by a second host computer. Thus, data received by the first host computer 106 may then not be properly stored on the tape 210 of the tape drive 112 as requested by the first host computer.

To address this issue, the host computer 106 may be configured to maintain the mode state of the tape drive 106 as requested by the host computer. Thus, as data is provided to the tape drive 112 for storage, the host computer 106 may verify the mode state of the tape drive to ensure that the data is stored as requested by the application 202. In one embodiment, the maintaining and verification of the tape drive mode is performed by the target level driver 204 of the host computer 106. By configured the target level driver 204 to perform this function, different types of applications 202 may be executed on the host computer 106 that are not required to be aware of changes to the mode state of the tape drive 112. In this manner, the applications 202 are free to perform other functions in relation to providing the data to be stored. Further, because many applications 202 running on the host computer 106 are third party applications, the mode state maintenance function performed by target level driver 204 may allow the manufacturer of the tape drive 112 to provide this functionality to any third party application. Also, as described in more detail below, the target level driver 204 may be configured to parse the one or more mode change commands transmitted to the tape drive 112 to determine any mode change requests that may not be accessible through a typical request of the mode state of the tape drive 112.

Figure 3A:
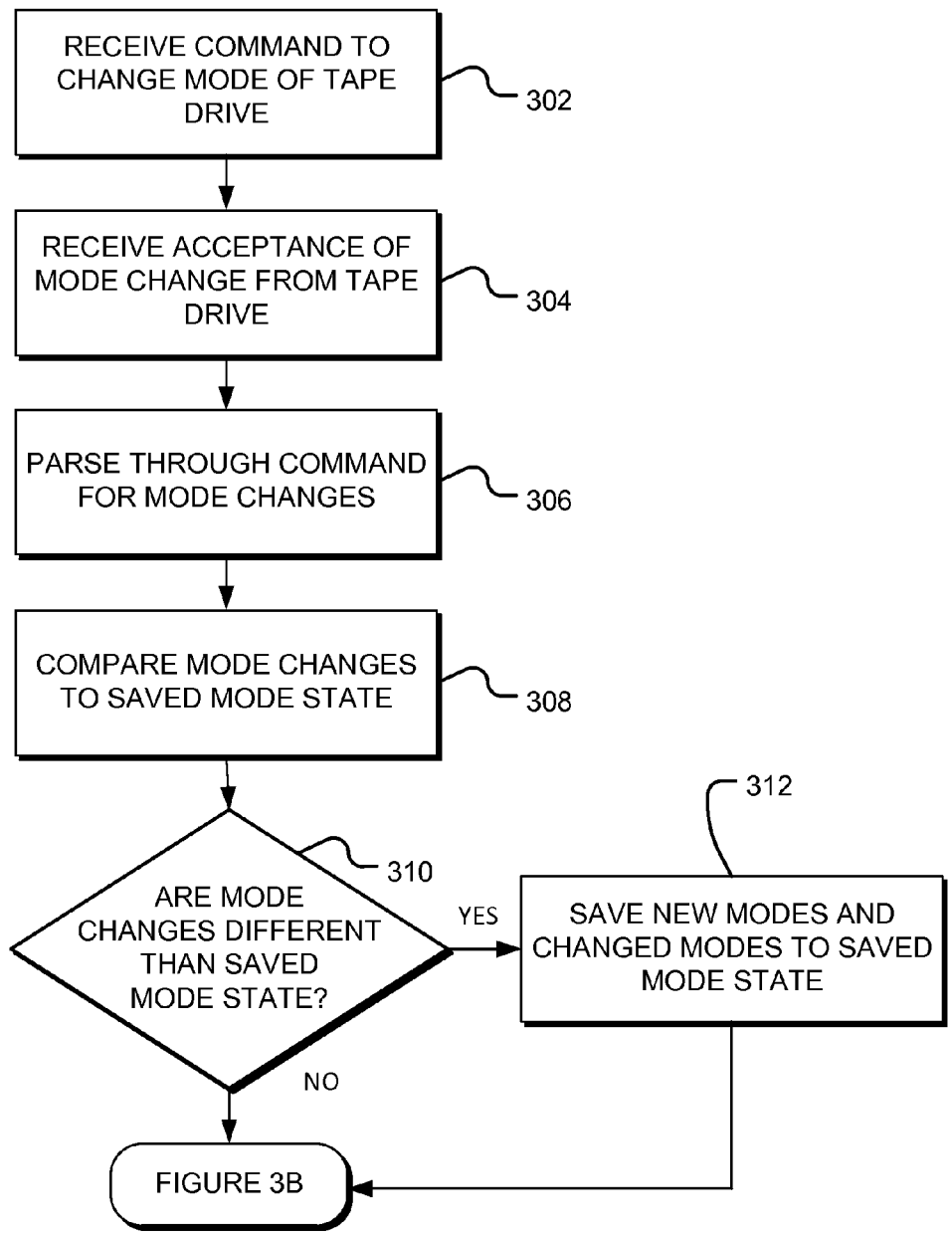
FIGS. 3A and 3B is a flowchart illustrating a method for monitoring and maintaining a mode state of a tape drive of a tape drive system.
Figure 3B:
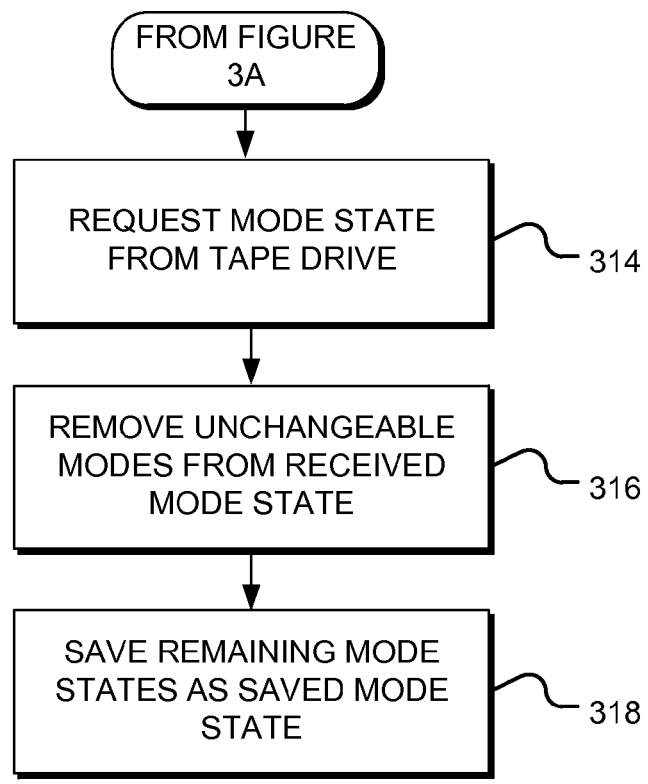

One method for monitoring and maintaining a mode state of a tape drive of a tape drive system is illustrated in FIGS. 3A and 3B. As mentioned, in one embodiment the operations of the flowchart may be performed by the target level driver 204 of the host computer 106. However, it should be appreciated that the operations of the flowchart 300 of FIGS. 3A and 3B may be performed by any component of the host computer 106 in communication with the application 202.

Beginning in operation 302, the target level driver 204 receives a command from the application 202 to change the operational mode of the tape drive 112. As mentioned above, the operational modes of the tape drive include features of the data written to or read from the tape drive, such as compression, location on the tape 210 that data is written or stored, whether data protection and/or data back-up is activated, data write verification and the like. Typically, the application 202 receives an indication of an operational mode of the tape drive 112 from a user of the host computer 106 and transmits an instruction to the target level driver 204 for translation into a command that the tape drive understands. After translation, the target level driver 204 transmits the command to the tape drive 112 through an I/O port 208 and along communication line 210. Upon receipt, the tape controller 212 may implement the mode change and, upon completion, transmits an acknowledgement message back to the target level driver. In some instances, however, the tape drive 112 may not implement the mode change request, such as if another host computer has control over the tape drive. In these circumstances, the tape drive 112 does not return the mode change acknowledgement message to the host computer 106.

If the tape drive 112 performs the requested mode change, then the target level driver 204 receives the acknowledgement message in operation 304. Upon receipt of the acknowledgement message, the target level driver 204 than parses through the change mode command in operation 306. In particular, the target level driver 204 may retain the mode change command, such as in a database 206 or storable medium as the mode change command is received. Thus, upon receipt of the acknowledgement message from the tape drive 112, the target level driver 204 may then parse through the stored change mode command as stored in the storage medium. To parse through the command, the target level driver 204 is configured to analyze the command and determine the requested changes to the operational mode of the tape drive is contained in the command. For example, the mode change command may request that the tape drive 112 operate in a data protect mode. This request is determined by the target level drive 204 through the parsing of the command in operation 306. It should be appreciated that any number of mode changes may be included in the mode change command and that each requested mode change is determined through the parsing of the command.

In operation 308, the target level driver 204 compares the requested mode changes (as determined through the command parsing) to a stored operational mode state of the tape drive 112. In particular, in one embodiment the target level driver 204 is configured to store an operational mode for the tape drive 112 as requested by the application 202. This stored mode state of the tape drive 112 is stored in the database 206 associated with the target level driver 204. This stored mode state of the tape drive 112 may be utilized by the target level driver 204 to return the operational mode of the tape drive to the requested state, such as after a failure and power on reset of the tape drive or when the operational mode of the tape drive is altered by another host computer.

As such, the target level driver 204 compares the requested mode changes contained in the change mode command to the stored operational mode state of the tape drive 112. In one example, the change mode command may be the first such command such that there is no operational mode state of the tape drive 112 stored in the database 206. In another embodiment, a requested operational mode state of the tape drive 112 is stored in the database 206 such that the changes to the mode state may be compared to the saved mode state in operation 308. In this manner, the target level driver 204 determines if any requested mode changes are different from the saved mode state of the tape drive 112 in operation 310.

If the target level driver 204 determines, in operation 310, that the requested mode change command changes a mode state as stored in the database, the new operational modes are stored in the mode state in operation 312. For example, the stored mode state may include a write protect operational mode when writing data to a tape. A change mode command may be received by the target level driver 204 from the application 202 to remove the write protect operational mode. In this example, the target level driver 204 compares the change mode command to remove the write protect to the stored mode state. The change to the mode state of removing the write protect operational mode is then saved in operation 312 as the new mode state of the tape drive 112. Similarly, if the change mode command includes changes to more than one operational mode, each mode change is compared to the saved mode state of the tape drive and changes made to the mode state are saved. In addition, any new modes requested by the command are also saved in the change mode state in operation 312.

In some embodiments, the tape drive 112 may include one or more operational mode options that are not typically maintained by the target level driver 204. For example, one embodiment of the tape drive 112 is limited to the number of operational modes that may be discovered by a request for mode state of the tape drive. Because the response to a request for mode state is limited to a certain number of bits, some mode states may not be reported by the tape drive 112. Rather, some tape drives 112 include more operational mode options than can be represented by the number of bits available to report the tape drive mode state. To account for this discrepancy, the target level driver 204 may also be configured to store mode states of the tape drive 112 that may not be reported by the tape drive itself. Thus, in operation 312, the target level driver 204 may also store any new or changed operational modes that may not be reported by tape drive 112.

Either after storing the new or changed operational modes or if there are no changes to the stored mode state, the target level driver continues to operation 314 of FIG. 3B. In operation 314, the target level driver 204 requests the mode state of the tape drive 112. To request the mode state, the target level driver 204 transmits a mode state request command to the tape drive 112 through the I/O port 28 and along the communication line 210. Upon receipt, the tape controller 212 is configured to report the current operational mode state for the tape drive 112. However, as mentioned above, the tape drive 112 may be limited in the number of operational modes that can be reported, such that some operational modes may not be reported to the host computer 106 in response to the request for mode state.

In operation 316, the target level driver 204 receives the mode state from the tape drive 112 in response to the request. Further, the target level driver 204 removes those operational modes of the tape drive 112 that are not changeable. For example, in some embodiments of the tape drive, some operational modes are not changeable by a host computer 106 or application 202. Rather, these operational modes are reserved for the tape controller 212 of the tape drive 112 to control and change. Thus, in operation 316, the target level driver 204 may also remove those operational modes reported by the tape drive 112 that are not changeable by the host computer 106. Removal of these unchangeable operational modes reduce the number of calculations and/or instructions that are processed by the target level driver.

In operation 318, the target level driver 204 saves the remaining reported operational modes as the saved mode state for the tape drive 112. However, as noted above, the tape drive 112 may not report all of the changeable operational modes upon a request. Thus, some operational modes may not be reported back to the host computer 106. In these circumstances, the operational modes not reported were stored in the mode state in operation 312 above. Such mode states are not overwritten by the storage of the reported mode state of the tape drive 112. In this manner, each requested operational mode change from the host computer 106 is maintained by the target level driver 202 in the database 206, including the operational modes not reported by the tape drive upon a request.

Figure 4:
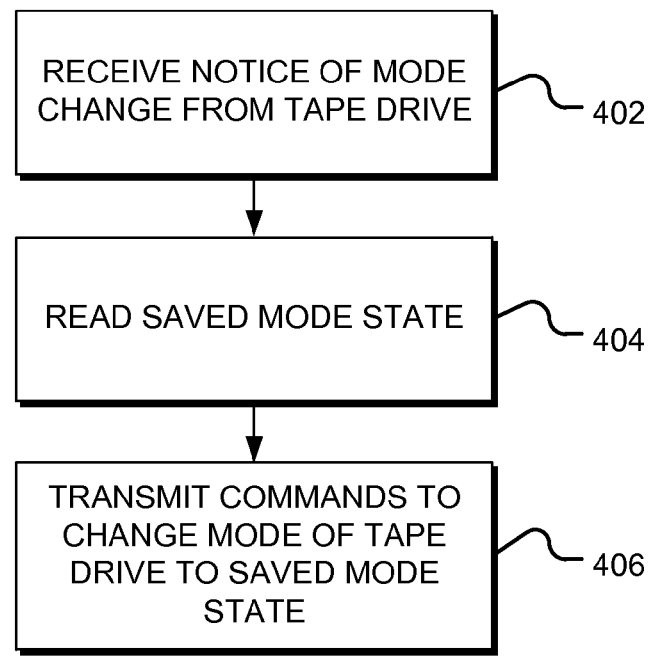
FIG. 4 is a flowchart illustrating a method for a driver of a host computer of a tape drive system to reset a mode of a tape drive.

Once the mode state of the tape drive 112 is stored by the target level driver 204, the host computer 106 can return the tape drive to a desired mode state in response to a change in the mode state of the tape drive. In particular, FIG. 4 is a flowchart illustrating a method for a target level driver of a host computer of a tape drive system to reset a mode of a tape drive. Some instances when the target level drive 204 may reset the mode state of the tape drive 112 include a power on reset of the tape drive or upon a change to the mode state from a separate host computer associated with the tape drive.

Beginning in operation 402, the target level driver 204 receives a notice of a mode change from the tape drive 112. In particular, some embodiments of the tape drive 112 provide a notice to connected or associated host computers when the tape drive experiences a change in operational modes. For example, a first host computer may change the operational mode of the tape drive when the first host computer has control of the tape drive. In this circumstance, the tape drive 112 provides a notification to the other host computers associated with the tape drive that a change in operational mode has occurred. Another example includes when the tape drive suffers a failure and resets to a default mode state. In any event, a change in the mode state of the tape drive 112 may be followed by a notification of a change in mode state to the host computer 106.

Upon receipt of the notice of a change in mode state, the target level driver 204 may read or other access the saved mode state from the associated database 206. The saved mode state may include the operational mode changes saved from a report from the tape drive 112 and those operational modes obtained by parsing through the various change mode commands provided by the application 202. Thus, the saved operational mode state in the database 204 accurately represents the desired mode state of the tape drive 112 as set by the application 202 for writing and/or reading data from the tape 210.

In operation 406, the target level driver 204 creates and transmits one or more commands to the tape drive 112 to place the tape drive in the desired operational mode state. The one or more commands may be transmitted through an I/O port 208 and over the communication line 210. These commands are received and executed by the tape controller 212 to configure the tape drive accordingly. In an alternate embodiment, the target level driver 204 provides one or more instructions to the application 202 detailing the saved mode state, through which the application generates the one or more commands to place the tape drive 112 in the desired mode state. In this manner, the target level driver 204 can ensure that data written to or read from the tape drive 112 is done so with the operational modes of the tape drive as requested by the application 202.

Figure 5:
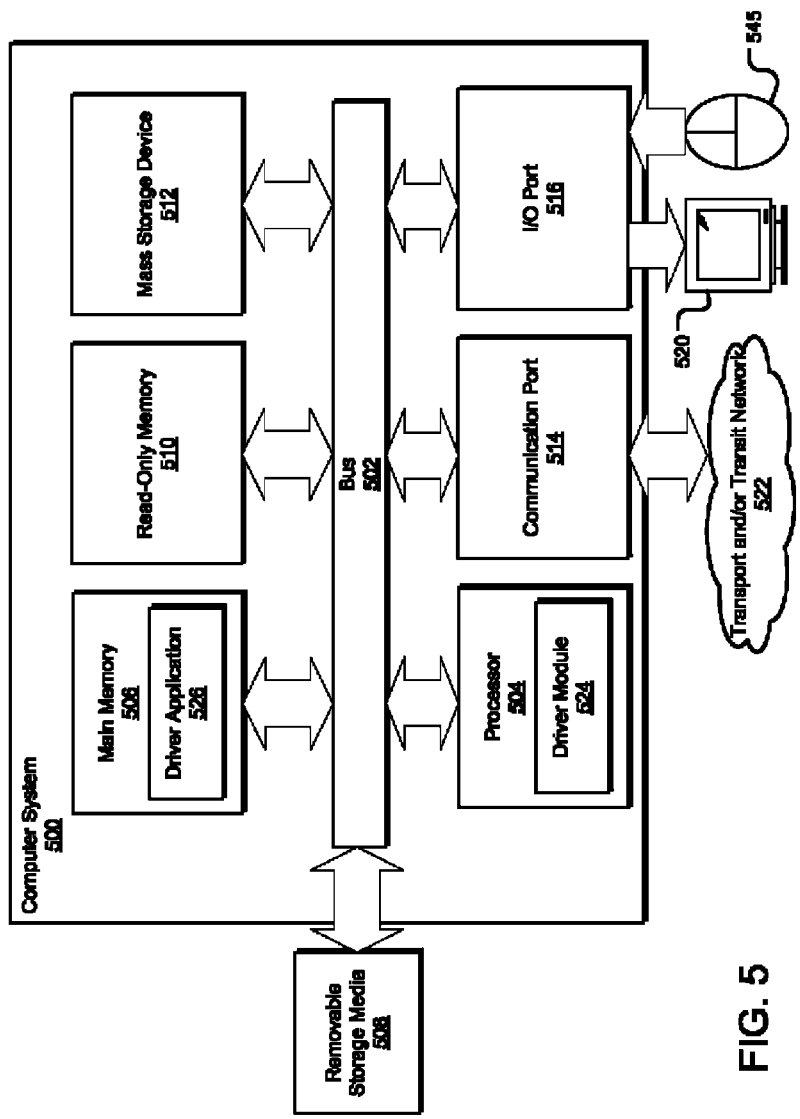
FIG. 5 is an example computing system that may implement various systems and methods discussed herein.

FIG. 5 is an example computing system that may implement various systems and methods discussed herein. The computer system 500 includes one or more processors 504. The processor 504 may include one or more internal levels of cache (not shown) and a bus controller or bus interface unit 502 to direct interaction with the processor 504. The processor 504 may include a tuning module 524 that specifically implements the various methods discussed herein. The main memory 506 may include one or more memory cards and a control circuit (not shown), or other forms of removable memory, and may store a tuning application 526 including computer executable instructions, that when run on the processor 504, implement the methods and system set out herein. Other forms of memory, such as a mass storage device 512, a read only memory 510, and a removable storage memory 508, may also be included and accessible, by the processor (or processors) 504 via the bus 502.

The computer system 500 may further include a communication port 514 connected to a transport and/or transit network 522 by way of which the computer system 500 may receive network data useful in executing the methods and system set out herein as well as transmitting information and network configuration changes determined thereby. The computer system 500 may include an I/O device 516, or other device, by which information is displayed, such as at display screen 520, or information is input, such as input device 545. The input device 545 may be alphanumeric input device, including alphanumeric and other keys for communicating information and/or command selections to the processor. The input device 545 may be another type of user input device including cursor control, such as a mouse, a trackball, or cursor direction keys for communicating direction information and command selections to the processors 504 and for controlling cursor movement on the display device 520. In the case of a tablet device, the input may be through a touch screen, voice commands, and/or Bluetooth connected keyboard, among other input mechanisms. The system set forth in FIG. 5 is but one possible example of a computer system that may employ or be configured in accordance with aspects of the present disclosure.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium (e.g., floppy diskette), optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic instructions.

The description above includes example systems, methods, techniques, instruction sequences, and/or computer program products that embody techniques of the present disclosure. However, it is understood that the described disclosure may be practiced without these specific details.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A method for operating a tape drive system, the method comprising:
    receiving a change mode request from an application executing on a host computer, the change mode request provided by the application configured to change an operational mode of a tape drive;
    parsing the change mode request to determine at least one operational mode change requested in the change mode request;
    storing at least one operational mode of the tape drive corresponding to the at least one operational mode change requested in the received change mode request in a database;
    converting the change mode request to a change mode command executable by the tape drive;
    transmitting the change mode request to the tape drive through an input/output port;
    transmitting a mode state request to the tape drive;
    receiving a mode state of the tape drive in response to the mode state request, the mode state of the tape drive comprising a set of operational modes, the set of operational modes of the tape drive not including the stored at least one operational mode of the tape drive; and
    storing the received mode state in the database with the at least one operational mode of the tape drive.

2. The method of claim 1 wherein the storing operation comprises:
    comparing the operational mode changes requested in the change mode request to a saved mode state of the tape drive; and
    storing the at least one operational mode change requested in the change mode request if the at least one operational mode is in the saved mode state of the tape drive.

3. The method of claim 1 further comprising:
    receiving an acknowledgement message from the tape drive, the acknowledgement message indicating that the change mode command was executed by the tape drive.

4. The method of claim 1 further comprising:
receiving a change mode state indicator from the tape drive configured to indicate when a change in the mode state of the tape drive occurs;
obtaining the mode state of the tape drive from the database; and
creating one or more mode state commands to configure the tape drive in the obtained mode state.

5. The method of claim 4 further comprising:
transmitting the one or more mode state commands to the tape drive through the input/output port.

6. The method of claim 1 wherein the input/output port is a small computer system interface (SCSI) input/output port.

7. The method of claim 4 wherein the tape drive is associated with a plurality of host computers and the change mode state indicator is received when one of the plurality of host computers alters mode state of the tape drive.

8. The method of claim 1 wherein the at least one operational mode change is selected from a group comprising: write data protection, read data protection, position on a tape associated with the tape drive and data backup.

9. A system for controlling a data storage device, the system comprising:
a host computer comprising:
a user application configured to provide an interface to a user of the host computer;
a storage component for storing computer-readable data; and
a target level driver, the target level driver configured to:
receive a change mode request from the user application, the change mode request provided by the application configured to change an operational mode of a tape drive;
parse the change mode request to determine at least one operational mode change requested in the change mode request;
store at least one operational mode of the tape drive corresponding to the at least one operational mode change requested in the received change mode request in the storage component;
create and transmit one or more change mode commands to the tape drive, the one or more commands configured to be executed by the tape drive to change the operational mode of the tape drive;
transmit a mode state request to the tape drive;
receive a mode state of the tape drive in response to the mode state request, the mode state of the tape drive comprising a set of operational modes, the set of operational modes of the tape drive not including the stored at least one operational mode of the tape drive; and
store the received mode state in the storage component with the at least one operational mode of the tape drive.

10. The system of claim 9 further comprising:
an input/output port connected to a tape drive associated with the host computer through a communication line.

11. The system of claim 10 wherein the input/output port connected to the tape drive associated with the host computer through the communication line is a small computer system interface (SCSI) input/output port.

12. The system of claim 9 wherein the target level driver is further configured to:
compare the operational mode changes requested in the change mode request to a saved mode state of the tape drive; and
store the at least one operational mode change requested in the change mode request if the at least one operational mode is in the saved mode state of the tape drive.

13. The system of claim 9 wherein the target level driver is further configured to:
receive an acknowledgement message from the tape drive, the acknowledgement message indicating that the change mode command was executed by the tape drive.

14. The system of claim 9 wherein the user application is further configured to connect to a remote user computer and provide the interface to a remote user.

15. The system of claim 9 wherein host computer further comprises one or more processing devices and wherein the target level driver comprises one or more instructions stored on the storage component that are executed by the one or more processing devices.

16. The system of claim 10 wherein the target level driver is further configured to:
receive a change mode state indicator from the tape drive configured to indicate when a change in the mode state of the tape drive occurs;
obtain the mode state of the tape drive from the storage component;
create one or more mode state commands to configure the tape drive in the obtained mode state; and
transmit the one or more mode state commands to the tape drive through the input/output port.

17. The system of claim 16 wherein the change mode state indicator is received from the tape drive following a resetting of the tape drive.

18. The system of claim 10 wherein the input/output port comprises a plurality of ports connected to a plurality of communication lines associated with the tape drive.

* * * * *